US011976960B2

(12) United States Patent
Imagawa et al.

(10) Patent No.: US 11,976,960 B2
(45) Date of Patent: May 7, 2024

(54) AXLE LOAD MEASURING APPARATUS AND AXLE LOAD MEASURING METHOD

(71) Applicant: Panasonic Intellectual Property Management Co., Ltd., Osaka (JP)

(72) Inventors: Taro Imagawa, Osaka (JP); Akihiro Noda, Osaka (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 887 days.

(21) Appl. No.: 17/015,675

(22) Filed: Sep. 9, 2020

(65) Prior Publication Data

US 2020/0408586 A1 Dec. 31, 2020

Related U.S. Application Data

(63) Continuation of application No. PCT/JP2018/041834, filed on Nov. 12, 2018.

(30) Foreign Application Priority Data

Mar. 22, 2018 (JP) ................. 2018-055303

(51) Int. Cl.
*G01G 19/02* (2006.01)
*B60W 40/06* (2012.01)
(Continued)

(52) U.S. Cl.
CPC .......... *G01G 19/022* (2013.01); *B60W 40/06* (2013.01); *B60W 40/13* (2013.01); *G01B 11/24* (2013.01);
(Continued)

(58) Field of Classification Search
CPC ........ G01G 19/022; G01G 9/00; G01G 19/03; B60W 40/06; B60W 40/13;
(Continued)

(56) References Cited

U.S. PATENT DOCUMENTS

| 7,197,422 B2 * | 3/2007 | Gaunt | B60C 23/04 73/146.2 |
| 2016/0040984 A1 * | 2/2016 | Byrne | G06T 7/507 348/92 |

(Continued)

FOREIGN PATENT DOCUMENTS

| JP | 4071412 B2 * | 4/2008 |
| JP | 2010197249 | * 9/2010 |

(Continued)

OTHER PUBLICATIONS

International Search Report dated Jan. 29, 2019 in International (PCT) Application No. PCT/JP2018/041834.
(Continued)

*Primary Examiner* — Alexander Satanovsky
*Assistant Examiner* — Asm Fakhruddin
(74) *Attorney, Agent, or Firm* — Wenderoth, Lind & Ponack, L.L.P.

(57) ABSTRACT

An axle load measuring apparatus includes a displacement calculator, a storage, and an axle load calculator. The displacement calculator detects displacements of positions on a road caused by an axle load using a captured image of the road and a vehicle thereon. When a certain amount of load is applied to a predetermined position of the road, the storage stores a displacement function representing shape information of a spatial distribution of a displacement of the road originated from the predetermined position. The axle load calculator calculates the axle load based on the displacements of the positions and the displacement function.

11 Claims, 16 Drawing Sheets

(51) Int. Cl.
*B60W 40/13* (2012.01)
*G01B 11/24* (2006.01)
*G01G 9/00* (2006.01)
*G06T 7/70* (2017.01)

(52) U.S. Cl.
CPC ............... *G01G 9/00* (2013.01); *G06T 7/70* (2017.01); *B60W 2420/403* (2013.01); *B60W 2530/00* (2013.01); *G06T 2207/30252* (2013.01)

(58) Field of Classification Search
CPC .......... B60W 2420/42; B60W 2530/00; G01B 11/24; G06T 7/70; G06T 2207/30252; G01P 3/38
See application file for complete search history.

(56) References Cited

U.S. PATENT DOCUMENTS

2017/0200275 A1\* 7/2017 McCloskey ............ G01G 17/00
2017/0361707 A1\* 12/2017 Flogård ................. B60W 10/22
2018/0045556 A1    2/2018 Imagawa

FOREIGN PATENT DOCUMENTS

JP          2013-7624          1/2013
WO    WO-2012172713 A1 \* 12/2012 .......... B60W 40/072

OTHER PUBLICATIONS

Office Action dated Nov. 30, 2021, in corresponding Chinese Patent Application No. 201880091201.3, with English translation of the search report.
Office Action dated Jul. 1, 2022 in corresponding Chinese Patent Application No. 201880091201.3, with English-language translation of search report.

\* cited by examiner

AXLE LOAD MEASURING APPARATUS AND AXLE LOAD MEASURING METHOD

CROSS REFERENCE TO RELATED APPLICATIONS

This application is a U.S. continuation application of PCT International Patent Application Number PCT/JP2018/041834 filed on Nov. 12, 2018, claiming the benefit of priority of Japanese Patent Application Number 2018-055303 filed on Mar. 22, 2018, the entire contents of which are hereby incorporated by reference.

BACKGROUND

1. Technical Field

The present disclosure relates to an axle load measuring apparatus and an axle load measuring method for measuring the axle load of a vehicle passing on a road from a captured image of the vehicle.

2. Description of the Related Art

Japanese Unexamined Patent Application Publication No. 2013-7624 discloses an axle load measuring apparatus. The axle load measuring apparatus preliminarily stores the vehicle numbers of test vehicles, known axle loads, and known total weights as known data, and further preliminarily stores the tolerances of errors of the axle loads and the tolerances of errors of the total weights as determination data used in determination of the measurement precision. The axle load measuring apparatus captures the registration plate of a traveling test vehicle with an imaging camera, and reads the vehicle number to identify the test vehicle. For the identified test vehicle, based on a load sensor, the axle load measuring apparatus calculates a difference between the measured axle load and its known axle load and that between the measured total weight and its known total weight. The axle load measuring apparatus then determines whether the differences are within the tolerances, and thus determines the measurement precision.

SUMMARY

The present disclosure provides an axle load measuring apparatus and an axle load measuring method which enables highly precise measurement of the axle load of a vehicle passing on a road from a captured image of the vehicle.

The axle load measuring apparatus according to one aspect of the present disclosure is an axle load measuring apparatus which measures an axle load of a vehicle using a captured image of a road and the vehicle on the road, and includes a displacement calculator, a storage, and an axle load calculator. The displacement calculator detects displacements of positions on the road caused by the axle load using the captured image. The storage stores a reference displacement function representing shape information of a spatial distribution of a displacement of the road originated from a predetermined position on the road when a certain amount of load is applied to the predetermined position on the road. The axle load calculator calculates the axle load based on the displacements of the positions and the displacement function.

The axle load measuring method according to one aspect of the present disclosure is a method of measuring an axle load of a vehicle using a captured image of a road and the vehicle on the road, and includes calculating of the displacement, reading out, and calculating of the axle load. In the calculating of the displacement, displacements of positions on the road caused by the axle load are detected using the captured image. In the reading out, a displacement function representing shape information of a spatial distribution of a displacement on the road originated from a predetermined position is read out when a certain amount of load is applied to the predetermined position on the road. In the calculation of the axle load, the axle load is calculated using the displacements of the positions and the reference displacement function.

The axle load measuring apparatus and the axle load measuring method according to the present disclosure can highly precisely measure the axle load of the vehicle from the captured image of the vehicle passing on the road.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

The axle load measuring apparatus according to one aspect of an embodiment is an axle load measuring apparatus which measures an axle load of a vehicle using a captured image of a road and the vehicle on the road, and includes a displacement calculator, a storage, and an axle load calculator. The displacement calculator detects displacements of positions on the road caused by the axle load in the captured image. The storage stores a displacement function representing shape information of a spatial distribution of a displacement of the road originated from a predetermined position on the road when a certain amount of load is applied to the predetermined position on the road. The axle load calculator calculates the axle load based on the displacements of the positions and the displacement function.

Specific examples of the axle load measuring apparatus according to one aspect of the present disclosure will now be described. The embodiments described below all illustrate preferred specific examples of the present disclosure. Numeric values, shapes, materials, components, arrangements and positions of the components, connection forms, steps, order of the steps, and the like shown in the following embodiments are exemplary, and should not be construed as limitations to the present disclosure. The present disclosure is limited only by the scope of claims. Accordingly, among the components of the embodiments below, the components not described in an independent claim representing the most superordinate concept of the present disclosure are not always necessary to achieve the object of the present disclosure, but will be described as those that form more preferable embodiments.

Embodiment 1

Here, as one aspect of the present disclosure, an axle load measuring system will be described which is installed on a road on which general vehicles travel, and measures the displacement of the road caused by the axle load of the passing vehicle, and measures the axle load of the vehicle from the measured displacement.

1. Configuration

Figure 1:
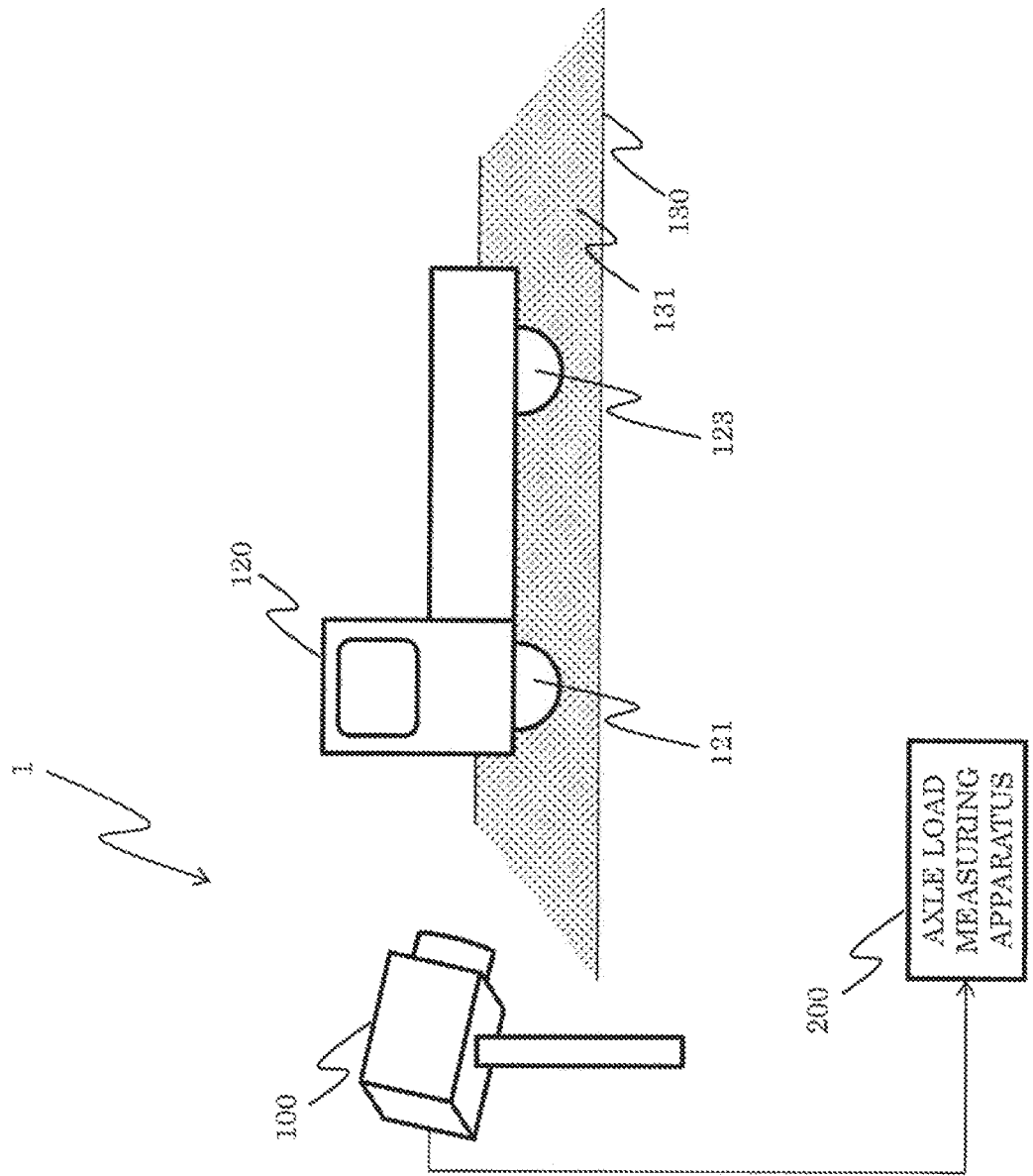
FIG. 1 is an appearance diagram schematically illustrating one example of how the displacement is measured.

FIG. 1 is an appearance diagram schematically illustrating one example of how to measure the axle load according to Embodiment 1 of the present disclosure.

As illustrated in FIG. 1, axle load measuring system 1 includes imaging apparatus 100 and axle load measuring apparatus 200. Road surface 131 of road 130 receives a load applied from a contact surface with tire 121 of vehicle 120, and displaces. The displacement of road surface 131 is affected and varied according to the state of tire 121, the air temperature, the temperature of road surface 131, and the traveling speed of vehicle 120.

Here, for example, axle load measuring apparatus 200 is connected to imaging apparatus 100 which captures road 130 on which vehicle 120 travels. A plurality of captured images produced by imaging apparatus 100 is input to axle load measuring apparatus 200. Axle load measuring apparatus 200 obtains a variety of pieces of information, which affect the displacement of the road surface, from the captured images and external appliances. The captured image is input and the information is obtained through wireless or wired communication or via a recording medium. Axle load measuring apparatus 200 measures the displacement of the road surface of road 130 from the input captured image and information. Axle load measuring apparatus 200 measures the axle load of vehicle 120 using the measured displacement of the road surface and the obtained information.

1-1 Axle Load Measuring Apparatus

Figure 2:
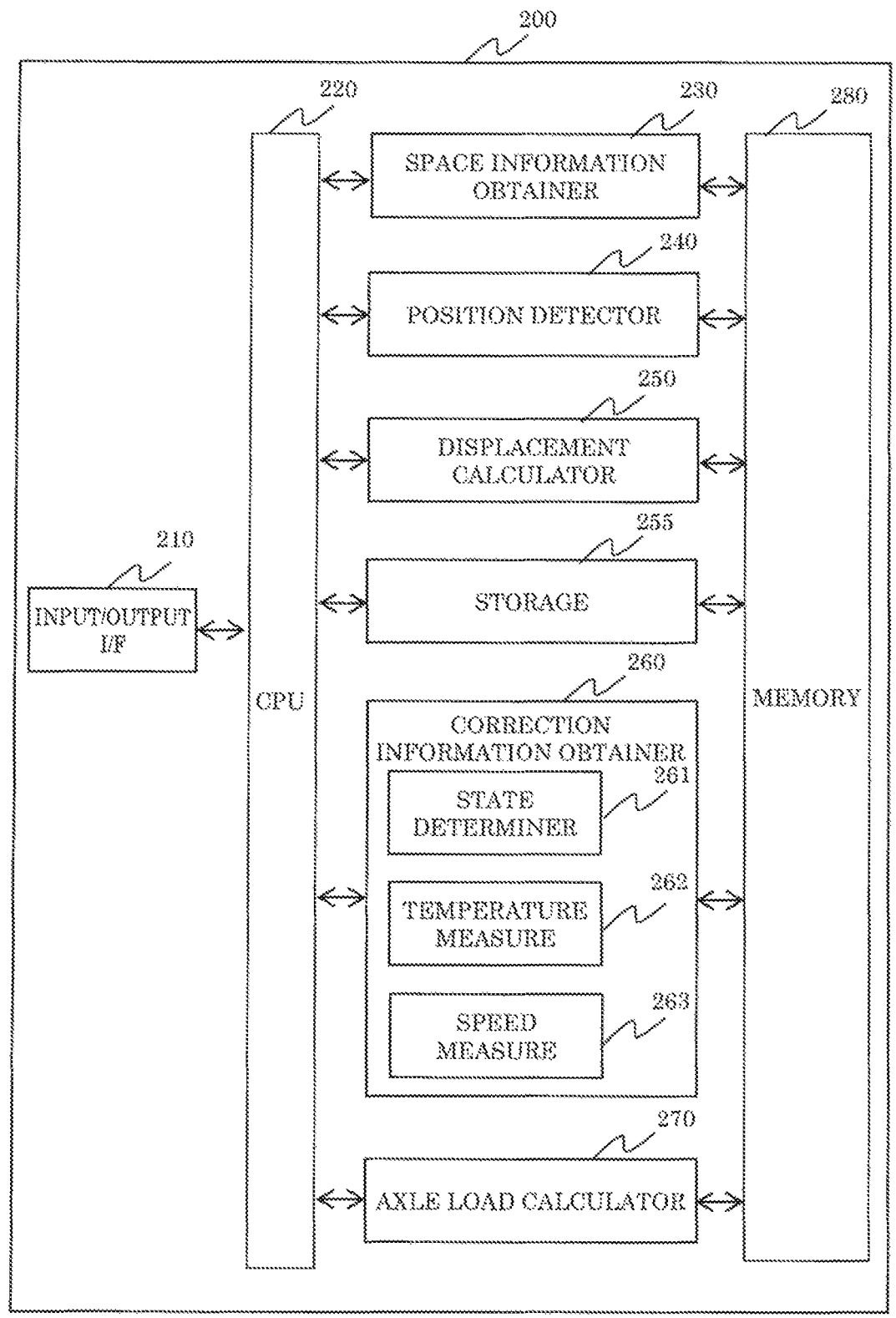
FIG. 2 is a block diagram illustrating a configuration of the axle load measuring apparatus according to Embodiment 1.

FIG. 2 is a block diagram illustrating a configuration of axle load measuring apparatus 200 according to Embodiment 1 of the present disclosure.

As illustrated in FIG. 2, axle load measuring apparatus 200 includes input/output interface 210, controller 220, space information obtainer 230, position detector 240, displacement calculator 250, storage 255, correction information obtainer 260, axle load calculator 270, and memory 280. Correction information obtainer 260 includes state determiner 261, temperature measure 262, and speed measure 263.

Axle load measuring apparatus 200 is implemented by a microprocessor such as a central processing unit (CPU) executing a program stored in memory 280, for example.

Input/output interface 210 receives an input of the captured image produced by imaging apparatus 100. For example, input/output interface 210 receives an input of a digital image of 4096×2160 pixels. Input/output interface 210 outputs the received captured image to controller 220. Input/output interface 210 receives a captured image produced by an imaging apparatus other than imaging apparatus 100, and a variety of pieces of information output by other apparatuses/devices.

Controller 220 controls the operations of the components. Controller 220 includes a non-volatile memory which stores programs, a volatility memory which is a temporary storage area for executing the programs, an input/output port, and a processor which executes the programs, for example.

Space information obtainer 230 obtains the space information of road surface 131 using a captured image not containing vehicle 120.

Figure 3:
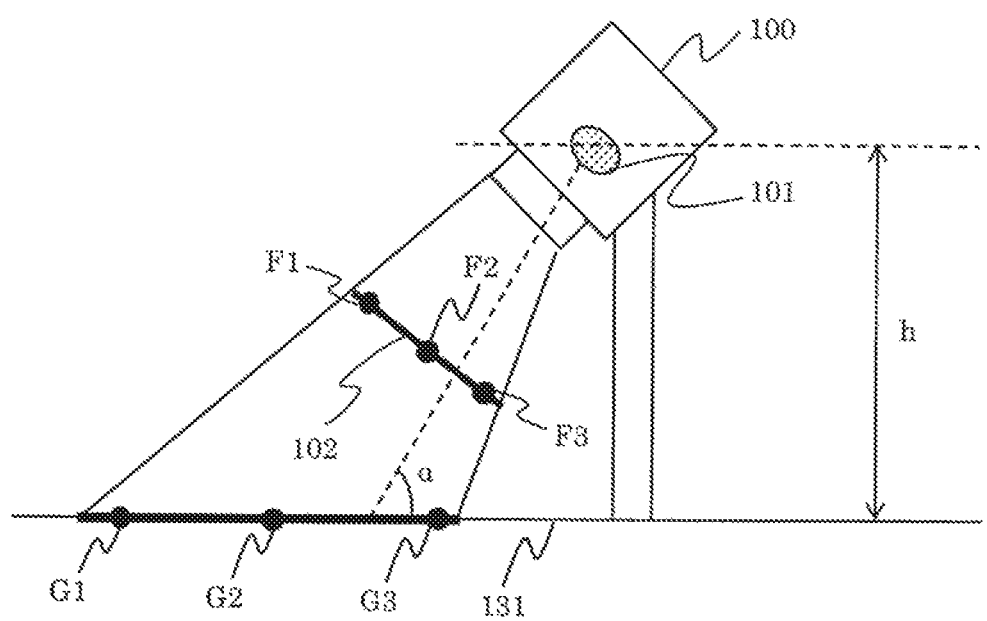
FIG. 3 is a diagram illustrating space information.

FIG. 3 is a diagram illustrating the space information. As illustrated in FIG. 3, space information obtainer 230 uses installation information indicating height (h) of imaging element 101 of imaging apparatus 100 from road surface 131, an angle of view (e.g., 4096×2160 pixels), and inclination (α) of imaging element 101 to road surface 131, the installation information being stored in memory 280. Space information obtainer 230 calculates the space information by calculating which points on road surface 131 are projected to which points in the captured image. Here, space information obtainer 230 may calculate the space information by calculating which points on road surface 131 are projected to points on virtual projection surface 102. The space information in the present disclosure indicates an actual length of a point per pixel. The space information is used to correct differences in the actual lengths of the points per pixel in the captured image. Space information obtainer 230 calculates the space information using a method such as perspective projection.

In FIG. 3, points G1, G2, and G3 on road surface 131 correspond to points F1, F2, and F3 on projection surface 102, respectively. Point F3 close to imaging apparatus 100 is a projection of point G3 on road surface 131, and point F1 remote from imaging apparatus 100 is a projection of point G1 on road surface 131. Although these points have the same pixel length in the captured image, their actual lengths are different. The actual length of point F2 per pixel is also different from those of points F1 and F3 per pixel, point F2 being a projection of point G2, which is an intermediate point between point G1 and point G3 on road surface 131. This is attributed to the followings: Points G1, G2, and G3 in the captured image are projected smaller as the distance between imaging apparatus 100 and the corresponding one of points G1, G2, and G3 is larger.

Space information obtainer 230 also stores image information around points G1, G2, and G3 in memory 280. By comparing the target captured image with another captured image (for example, a captured image not including vehicle 120) taken at a different time (comparing the positions of points F1, F2, and F3 in the image on projection surface 102), a change in posture of imaging apparatus 100 (a change in image capturing direction) is detected. When the change in posture of imaging apparatus 100 exceeds a predetermined threshold (e.g., 5 pixels), space information obtainer 230 outputs (sends) a signal indicating abnormality of the image capturing direction of imaging apparatus 100. Thereby, the abnormal posture of imaging apparatus 100 can be detected from the captured image.

When a captured image including vehicle 120 is used, space information obtainer 230 may also obtain the space information of road surface 131 based on an image region where the captured vehicle 120 is not included. Thereby, a temporary change in imaging apparatus 100 (camera shake) caused by passing of vehicle 120 can be detected, and the influences by the camera shake can be removed by subtracting a change amount of the posture of imaging apparatus 100 from the result of detected displacement of the road surface. The change in posture (the change in image capturing direction) obtained by space information obtainer 230 is one piece of correction information, and space information obtainer 230 is also one of correction information obtainers.

Position detector 240 extracts captured images stored in memory 280 in the order of image capturing time, and detects the positions of tires in each captured image. Position detector 240 can use a standard technique such as an image recognition technique, template matching, machine learning, or neural network as a method of detecting the tire positions in the captured image. The precision in detection of the position may be pixel unit-based or subpixel unit-based.

Displacement calculator 250 extracts the captured images stored in memory 280 in the order of image capturing time. Displacement calculator 250 then calculates the displacements of a plurality of positions on road surface 131 using an image within the detection area set within the captured image, the actual lengths of the points per pixel calculated by space information obtainer 230, and the tire positions detected by position detector 240. Displacement calculator 250 can use a standard displacement detection method such as block matching, correlation, a sampling moire method, or a point feature tracking as a method of detecting the displacement in the captured image. Here, examples of the correlation include normalized cross correlation, phase correlation, and laser speckle correlation. The precision in detection of the displacement may be pixel unit-based or subpixel unit-based.

Figure 4A:
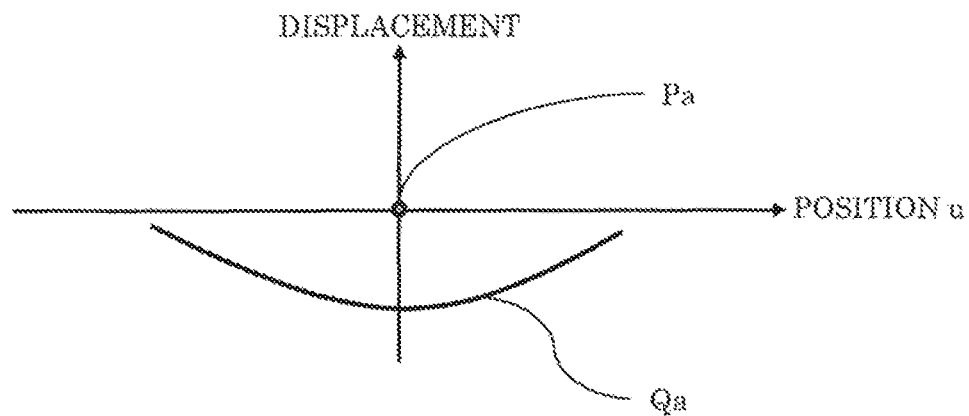
FIG. 4A is a graph illustrating one example of a reference displacement function.
Figure 4B:
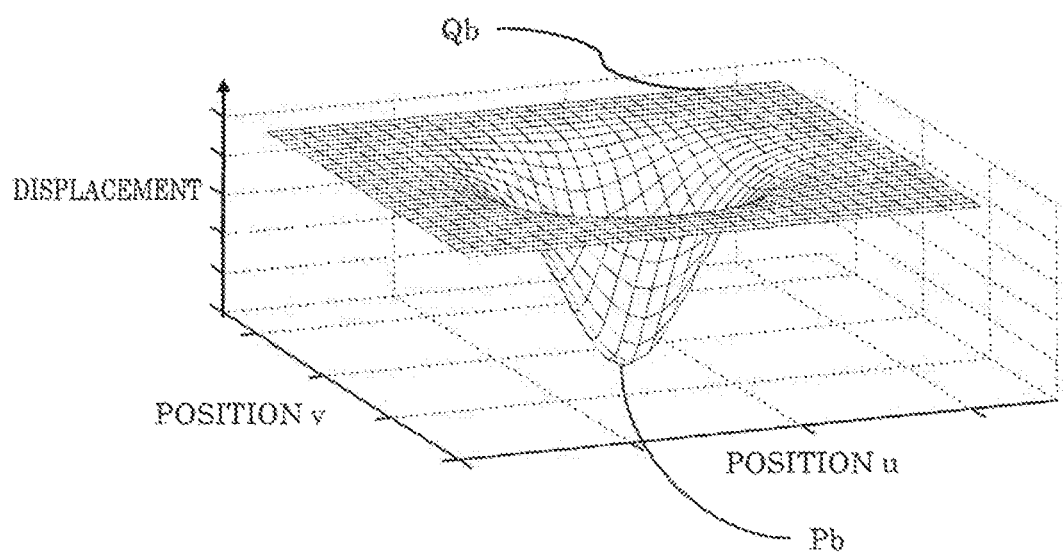
FIG. 4B is a graph illustrating one example of the reference displacement function.

Storage 255 stores the shape information of the spatial distribution of the displacement of road 130 originated from a predetermined position of road 130 (reference displacement function) when a certain amount of load is applied to the predetermined position of road 130. FIGS. 4A and 4B illustrate examples of the reference displacement function. FIG. 4A is an example of reference displacement function Qa representing a displacement distribution where load position Pa ($u=0$) is the center (a one-variable function representing a one-dimensional distribution of the displacement of the road surface (in the axial direction or the vehicle traveling direction)). FIG. 4B is an example of reference displacement function Qb representing a displacement distribution where load position Pb (where $u=0$ and $v=0$) is the center (a two-variable function representing a two-dimensional distribution of the displacement of the road surface). The reference displacement function may be in a continuous representation or in a discrete representation.

Correction information obtainer 260 obtains the correction information for correcting the axle load from the captured image. The correction information is related with vehicle 120 or imaging apparatus 100. For example, the correction information includes the tire positions of vehicle 120, the type of tire (whether it is dual tires), and the posture of imaging apparatus 100 (a change in image capturing direction).

State determiner 261 determines the states of tires. State determiner 261 can determine the states of tires through image recognition from the captured image of vehicle 120 taken from the front and side thereof. The captured image used in the determination by state determiner 261 may be produced by imaging apparatus 100, or may be produced by another imaging apparatus. State determiner 261 determines the number of tires per axle, the tire interval, the contact area with the road surface, and the inter-axle distance. State determiner 261 may determine the type of vehicle from the captured image through image recognition, and may determine the states of tires based on the type of vehicle.

At this time, state determiner 261 may determine the states of tires using the information of the tires stored in memory 280 and associated with the type of vehicle. More specifically, as the correction information, state determiner 261 may obtain information containing at least one of the information indicating the width of the tire of vehicle 120, the information indicating the number of tires per axle of vehicle 120, and the information indicating the distance between the axles of vehicle 120.

State determiner 261 may determine the states of tires from the information of a pressure sensor or a laser sensor installed on road 130.

Figure 5A:
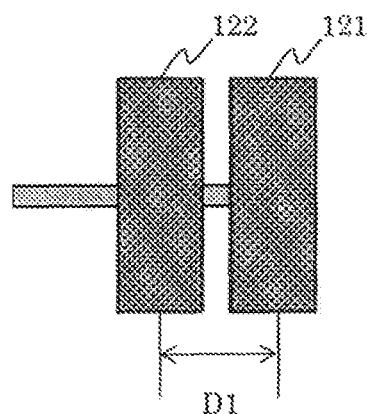
FIG. 5A is a schematic view of an axle viewed from the front of the vehicle.
Figure 5B:
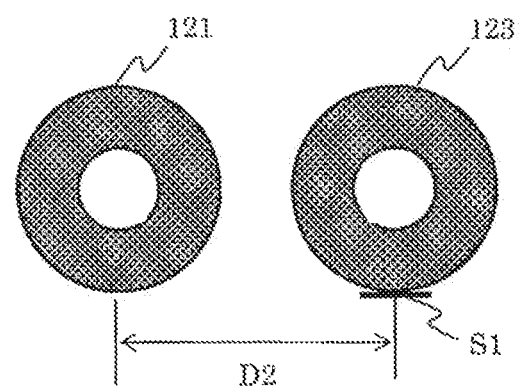
FIG. 5B is a schematic view illustrating the states of tires when the vehicle is viewed from a side thereof.

FIG. 5A is a schematic view of the rear axle viewed from the front of vehicle 120. FIG. 5B is a schematic view illustrating the states of tires viewed from a side of vehicle 120.

FIG. 5A illustrates the rear wheels of vehicle 120. In FIG. 5A, tires 121 and 122 are joined to one end of one axle. The inter-wheel distance between tire 121 and tire 122 is defined as distance D1. In FIG. 5B, the inter-axle distance between front tire 123 of vehicle 120 and rear tire 121 thereof is represented by distance D2. In FIG. 5B, the contact area between tire 121 and the road surface is represented by S1.

Temperature measure 262 measures the outer air temperature and the road surface temperature. Temperature measure 262 may obtain the temperature measured by a thermometer or thermocouple installed on road 130. Alternatively, temperature measure 262 may obtain the temperature from a captured image produced by a thermal camera.

Speed measure 263 extracts the captured images stored in memory 280 in the order of image capturing time. Speed measure 263 then measures the traveling speed of vehicle 120 using optical flow, template matching, or a background differencing technique. Speed measure 263 may obtain the traveling speed from an embedded sensor, a laser, or a sound wave sensor installed on road 130.

Axle load calculator 270 calculates the axle load of vehicle 120 passing on road 130 using the displacements of positions on road 130 detected by displacement calculator 250 and the reference displacement function stored in storage 255. Furthermore, in the case where correction by vehicle 120 or imaging apparatus 100 which has taken the captured image is needed, axle load calculator 270 calculates the axle load of vehicle 120 passing on road 130 using the displacements of positions on road 130 detected by displacement calculator 250, the reference displacement function stored in storage 255, and the correction information obtained by correction information obtainer 260.

Memory 280 stores the captured images and a variety of pieces of information input through input/output interface 210. Memory 280 stores the installation information of imaging apparatus 100. Memory 280 is also used as a work memory for the components. For example, memory 280 stores the space information obtained by space information obtainer 230. Memory 280 stores the position information of tire 121 detected by position detector 240.

Memory 280 stores the displacement of the road surface calculated by displacement calculator 250. Memory 280 stores the correction information obtained by correction information obtainer 260. Memory 280 stores the states of tires determined by state determiner 261. Memory 280 stores the outer air temperature and the road surface temperature measured by temperature measure 262. Memory 280 stores the traveling speed of vehicle 120 measured by speed measure 263. Memory 280 stores the axle load calculated by axle load calculator 270. Memory 280 includes a semiconductor memory element which enables high-speed operation, such as a dynamic random access memory (DRAM), for example.

2. Operation

2-1. Operation as a Whole

Figure 6:
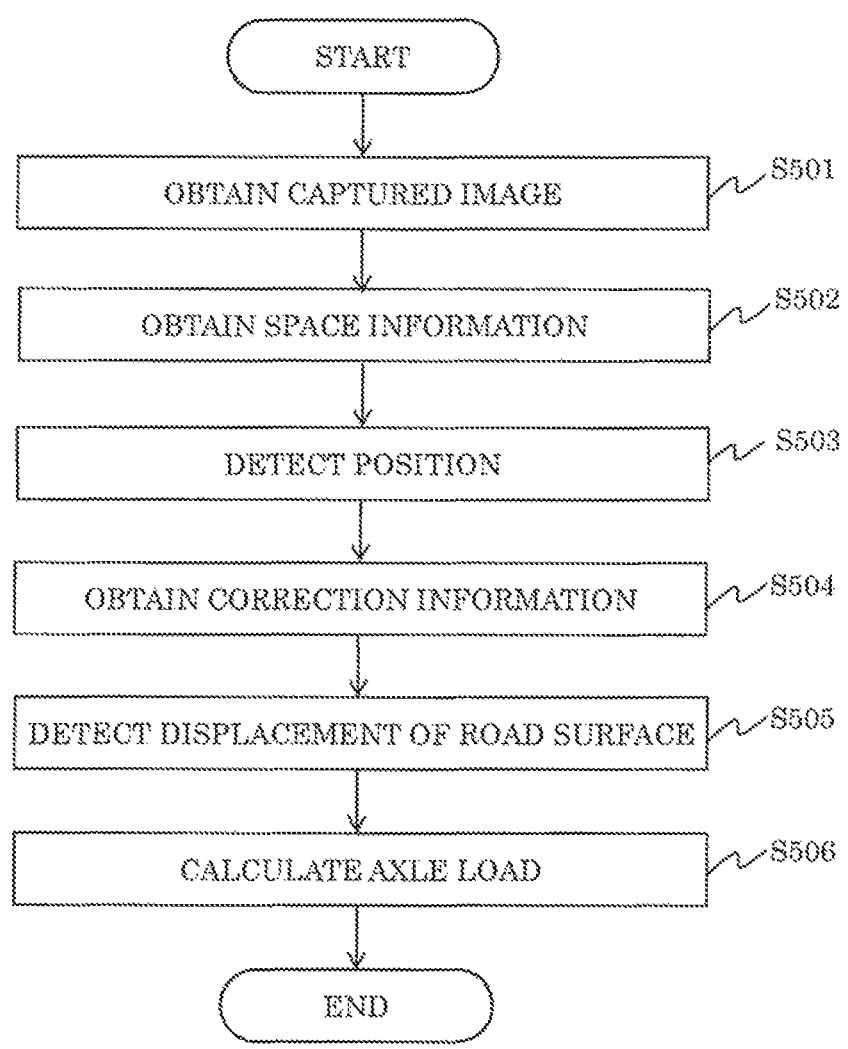
FIG. 6 is a flowchart illustrating an operation of the axle load measuring apparatus.

FIG. 6 is a flowchart illustrating the operation of axle load measuring apparatus 200 according to Embodiment 1.

Controller 220 obtains a captured image from imaging apparatus 100. Controller 220 obtains the captured image produced by imaging apparatus 100 through input/output interface 210. Controller 220 then stores the captured image in memory 280 (step S501).

Controller 220 causes space information obtainer 230 to obtain the space information (step S502). Space information obtainer 230 obtains the space information using the captured image and the installation information of imaging apparatus 100 stored in memory 280.

Controller 220 causes position detector 240 to detect the position of tire 121 in the captured image (step S503).

Controller 220 causes correction information obtainer 260 to obtain the information needed for calculation of the axle load (step S504). Correction information obtainer 260 causes part or all of state determiner 261, temperature measure 262, and speed measure 263 to obtain the information needed for calculation of the axle load, and to store the information as the correction information in memory 280. State determiner 261, temperature measure 262, and speed measure 263 obtain the correction information needed for calculation of the axle load using the captured image stored in memory 280.

Controller 220 causes displacement calculator 250 to calculate the displacement of road surface 131 using the captured image (step S505).

Controller 220 causes axle load calculator 270 to calculate the axle load of vehicle 120 using the displacement calculated by displacement calculator 250 and the correction information obtained by correction information obtainer 260 (step S506).

2-2. Detection of Displacement

First, displacement calculator 250 sets the size of the detection area for detecting the displacement in the captured image. Controller 220 may set a plurality of area sizes at a position arbitrarily set based on the tire position detected by position detector 240, and may determine the area size of the detection area from the result of displacement calculated for each area size. Alternatively, controller 220 may set positions based on the tire position, and may determine the area size of the detection area using the average, median, or the like of the results of the displacement calculated in the detection area set for each position.

Figure 7A:
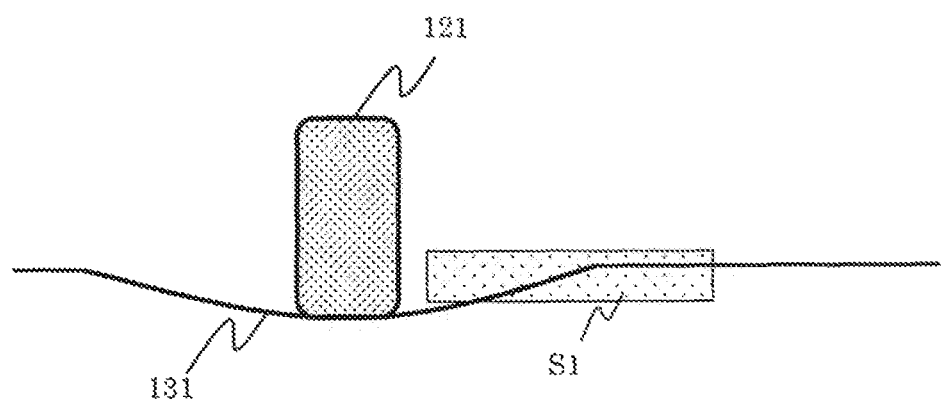
FIG. 7A is a schematic view illustrating one example of setting of the area.
Figure 7B:
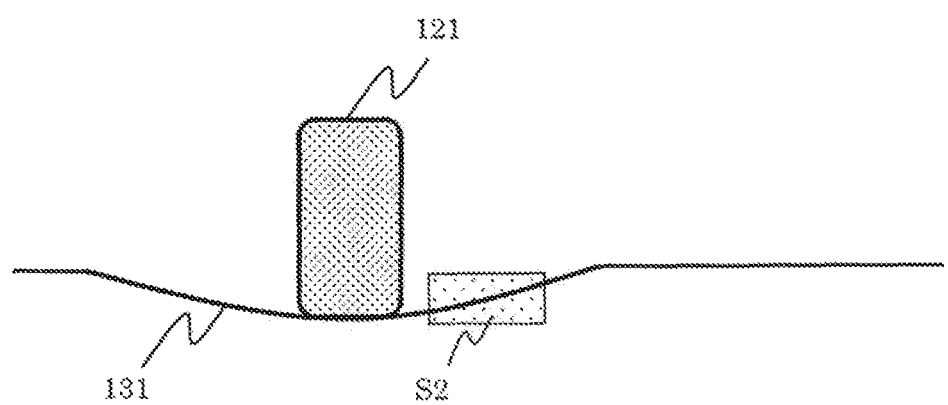
FIG. 7B is a schematic view illustrating another example of setting of the area.

FIG. 7A is a schematic view illustrating one example of setting of the area. FIG. 7B is a schematic view illustrating another example of setting of the area.

FIGS. 7A and 7B each illustrate a displacement of road surface 131 caused by the axle load of the vehicle where road surface 131 is in contact with tire 121 of the vehicle traveling on road 130 (see FIG. 1). In FIG. 7A, area S1 is set as the detection area by controller 220. Furthermore, in FIG. 7B, area S2 is set as the detection area by controller 220.

Figure 8:
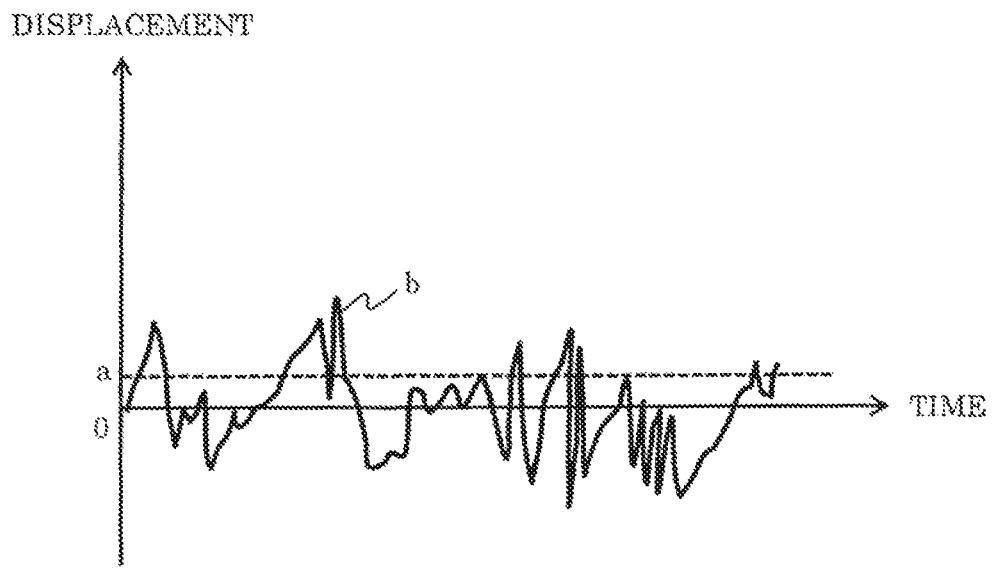
FIG. 8 is a diagram illustrating noises in a captured image.
Figure 9:
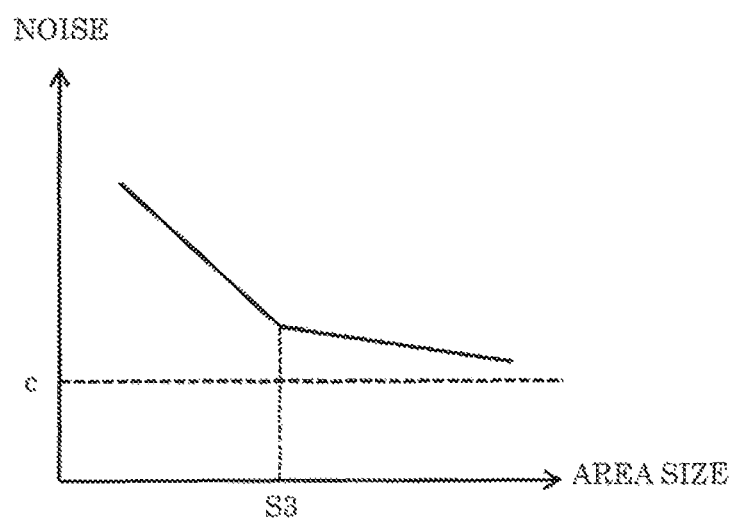
FIG. 9 is a diagram illustrating the relation between noises and the area size.

FIG. 8 is a diagram illustrating noises in the captured image. FIG. 9 is a diagram illustrating the relation between the noises and the area size. In FIG. 8, the ordinate represents the displacement and the abscissa represents the time. In FIG. 9, the ordinate represents the noises and the abscissa represents the area size.

FIG. 8 illustrates the displacements detected in the order of image capturing time for captured images not including any vehicle. In this case, the displacement is not calculated from between the captured images. For this reason, the result of the calculation of the displacement is 0 at each time. Actually, as illustrated in FIG. 8, displacement b is calculated as a noise component due to noises of imaging element 101 (see FIG. 3), slight air movement, and the like. For this reason, variance a of displacement b can be considered as the noises, for example. Rather than the variance, the standard deviation may be considered as the noises.

Such noises are usually white noise. For this reason, in template matching, when the area size is increased as in area S1 in FIG. 7A, the noises are averaged to reduce the influences by the noises as illustrated in FIG. 9. In other words, when the area size is increased, the noises are closer to saturated value c. In contrast, by increasing the proportion of the region where a displacement occurs to the region of the detection area as in area S2 in FIG. 7B, the sensitivity in the displacement is enhanced.

Figure 10:
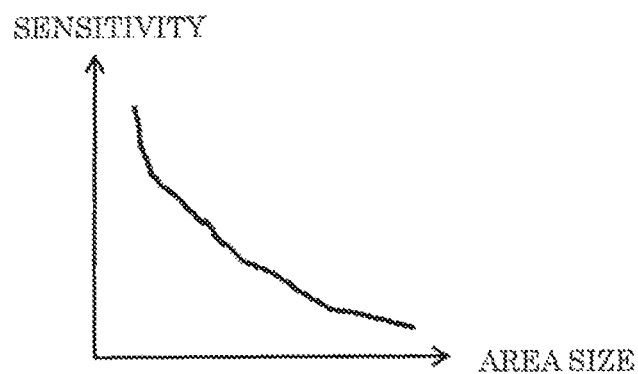
FIG. 10 is a diagram illustrating the relation between the sensitivity in detection of the displacement and the area size.

As illustrated in FIG. 10, as the area size is larger, the sensitivity in the detection of the displacement is lower. FIG. 10 is a diagram illustrating the relation between the sensitivity in the detection of the displacement and the area size. In FIG. 10, the ordinate represents the sensitivity and the abscissa represents the area size. A larger area size results in a larger proportion of the region having no displacement to the region of the detection area. Accordingly, in the case where template matching is performed, a force to match with the region having no displacement becomes stronger, resulting in lower sensitivity in the detection of the displacement.

Figure 11:
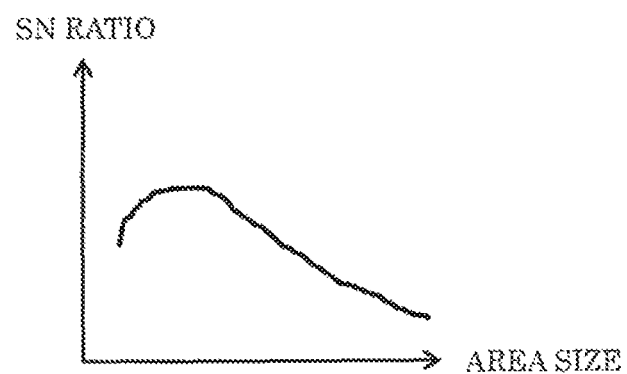
FIG. 11 is a diagram illustrating the relation between the area size and the SN ratio.

From this, the relation between the area size and the signal noise ratio (SN ratio) is considered to be as shown in FIG. 11. FIG. 11 is a diagram illustrating the relation between the area size and the SN ratio. In FIG. 11, the ordinate represents the SN ratio and the abscissa represents the area size. As illustrated in FIG. 11, when the SN ratio has a peak, the area size corresponding to the peak position may be set as the size of the detection area. When the SN ratio has no peak, area size S3 in FIG. 9 where the noise level rises may be set as the size of the detection area.

Controller 220 calculates the area size by any one of the methods described above.

Next, controller 220 adjusts the calculated area size using the actual lengths of the points per pixel obtained by space information obtainer 230.

Controller 220 adjusts the area size according to the space information (the actual length per pixel). For example, controller 220 sets a reference for the actual length at 10 cm, for example, and adjusts the area size (pixel size) for each position of tire 121 using the space information such that the area size is the reference size. This is because unless the area size based on the same reference is used, the same displacement is not obtained under the same load. In other words, the area size is converted into a pixel size corresponding to the actual length.

Figure 12A:
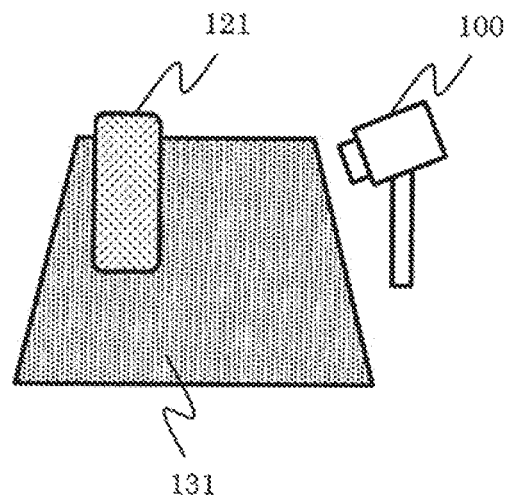
FIG. 12A is a diagram illustrating a positional relation between the imaging apparatus and the tire.
Figure 12B:
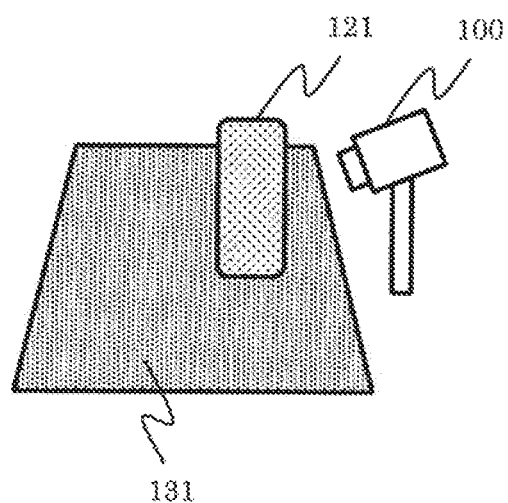
FIG. 12B is a diagram illustrating a positional relation between the imaging apparatus and the tire.
Figure 13A:
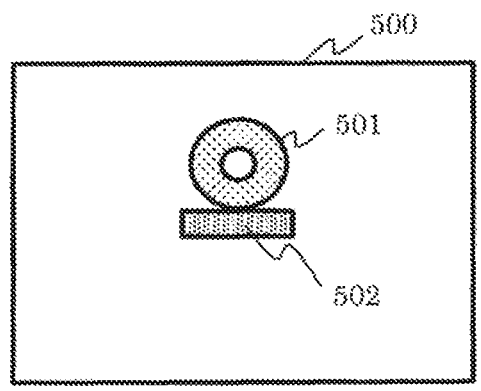
FIG. 13A is a diagram illustrating the captured image produced by the imaging apparatus in the state of FIG. 12A.
Figure 13B:
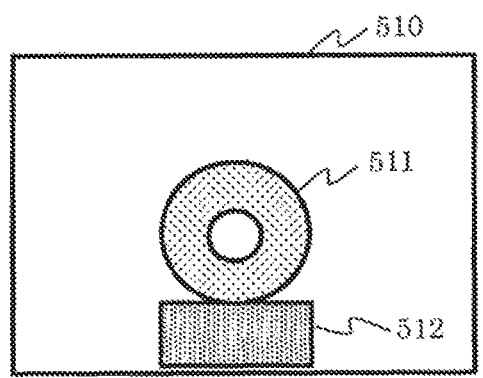
FIG. 13B is a diagram illustrating the captured image produced by the imaging apparatus in the state of FIG. 12B.

FIGS. 12A and 12B are diagrams illustrating the positional relation between imaging apparatus 100 and tire 121. FIG. 13A is a diagram illustrating a captured image of tire 121 taken by imaging apparatus 100 in the state of FIG. 12A. FIG. 13B is a diagram illustrating a captured image of tire 121 taken by imaging apparatus 100 in the state of FIG. 12B.

FIG. 12A illustrates tire 121 located remote from imaging apparatus 100. FIG. 12B illustrates tire 121 located close to imaging apparatus 100. FIG. 13A illustrates captured image 500 produced by imaging apparatus 100 in the state of FIG. 12A. FIG. 13B illustrates captured image 510 produced by imaging apparatus 100 in the state of FIG. 12B. As illustrated in FIGS. 13A and 13B, because of the distance between imaging apparatus 100 and tire 121 during image capturing, tire 501 in captured image 500 is captured smaller than tire 511 in captured image 510.

Here, the position of tire 501 in FIG. 13A corresponds to the position of point F1 in FIG. 3. The position of tire 511 in FIG. 13B corresponds to the position of point F3 in FIG. 3. At this time, assume that the actual length per pixel of each point calculated by space information obtainer 230 is 3/5 cm in the pixels at and around point F1 and is 3/20 cm in pixels at and around point F3. At this time, assuming that the area size (length×width) is 3 cm×60 cm, the area size of detection area 502 in captured image 500 is 5 pixels×100 pixels and the area size of detection area 512 in captured image 510 is 20 pixels×400 pixels. The size of detection area 502 illustrated in FIG. 13A is 5 pixels×100 pixels, and the size of detection area 512 illustrated in FIG. 13B is 20 pixels×400 pixels. By adjusting the area size as above, the target regions for detection of the displacement can be controlled to have the same size although the sizes of detection areas 502 and 512 are different in the captured images.

For captured image 500, displacement calculator 250 calculates the displacement using only an image within detection area 502 within captured image 500. For captured image 510, displacement calculator 250 calculates the displacement using only an image within detection area 512 within captured image 510.

2-3. Calculation of Axle Load

Figure 14A:
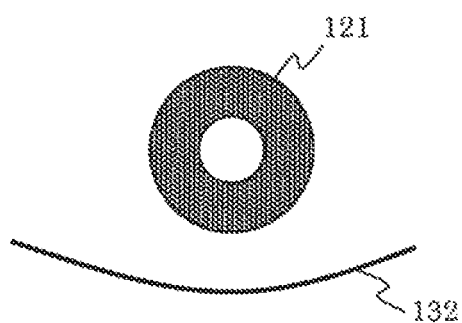
FIG. 14A is a schematic view illustrating one example of the displacement of the road surface caused by the axle load.
Figure 14B:
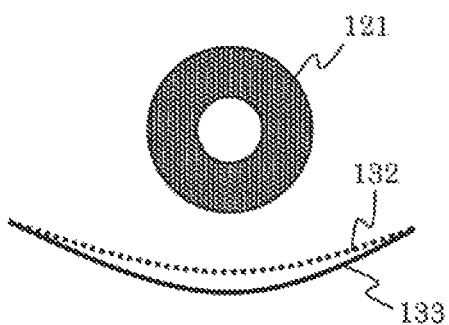
FIG. 14B is a schematic view illustrating another example of the displacement of the road surface caused by the axle load.

FIG. 14A is a schematic view illustrating one example of the displacement of the road surface caused by the axle load. FIG. 14B is a schematic view illustrating another example of the displacement of the road surface caused by the axle load.

As illustrated in FIG. 14A, the pressure caused by the axle load applied through tire 121 causes a displacement in road surface 132 on which the vehicle is traveling. Here, the pressure caused by the axle load varies according to a variety of conditions, and therefore the road surface varies as road surface 132 or road surface 133 illustrated in FIG. 14B.

For example, the total contact area with the road surface is different even among vehicles having the same axle load if the number of wheels per axle and/or the tire diameter are different. As a result, the pressure applied to the road surface is varied, and thus the displacement of the road surface is also varied. In the case where the road surface is paved, the elasticity coefficient of the pavement is varied according to the air temperature and/or the road surface temperature. For this reason, the displacement when the same pressure is applied is varied. In the case where the vehicle is accelerating or decelerating at the image capturing point, the loads applied to the axles are varied according to the accelerating or decelerating rate. For example, under braking, the load applied to the front wheel axle is increased.

In the case where the vehicle vibrates due to the state of the road surface (the profile of the road surface), the pressure applied to the road surface is increased at a moment when the vehicle sinks. For this reason, its apparent load is increased. Conversely, the pressure applied to the road surface is reduced at a moment when the vehicle rises. For this reason, its apparent load is reduced. The resistance of the road surface itself against the weight can be considered to be mainly composed of a static resistance and a dynamic resistance. Here, the dynamic resistance is considered as the speed of the vehicle on the road surface. For this reason, the displacement of the road surface can also be varied according to the speed of the vehicle.

Calculation of the axle load requires a static load. However, the load varies according to the pressure as described above. For this reason, its apparent static load is varied according to a variety of conditions. Furthermore, only the displacement of the road surface can be known from the captured image.

From this, axle load calculator 270 corrects the displacement using the information such as the displacement calculated by displacement calculator 250, the states of tires obtained by correction information obtainer 260, the temperature, and the speed of the vehicle, and calculates the axle load.

2-3-1. Calculation of Axle Load Using Relational Expression

Axle load calculator 270 may calculate the axle load using a relational expression between the displacement and the axle load.

Specifically, axle load calculator 270 calculates the axle load using a displacement coefficient. As the displacement coefficient, when a displacement occurs in road 130 because of the axle load applied to the wheels of road 130, a relational expression indicating the relation between the axle load and the displacement and the coefficient used in this relational expression can be used. Axle load calculator 270 preliminarily stores the relational expression and the displacement coefficient.

Generally, the axle load w (kg) is represented by the expression w=f(d) as function f of displacement d. In the present disclosure, function f is approximated by a primary expression and treated. Axle load calculator 270 stores the primary expression w=αd as the relational expression where the variable is represented by d and the displacement coefficient is represented by α.

Displacement coefficient α is different according to the type of asphalt constituting road 130 and the composition thereof. A vehicle having a known axle load is preliminarily run on road 130 to examine the relation between the axle load and the displacement of road 130 when the vehicle is running. Thereby, displacement coefficient α can be preliminarily determined. Axle load calculator 270 stores displacement coefficient α. Axle load calculator 270 converts the displacement detected by displacement calculator 250 to the axle load of the vehicle.

2-3-2. Calculation of Axle Load Using Displacement Shape

Axle load calculator 270 may calculate the axle load from the displacement shape of road surface 131 calculated by displacement calculator 250.

Figure 15A:
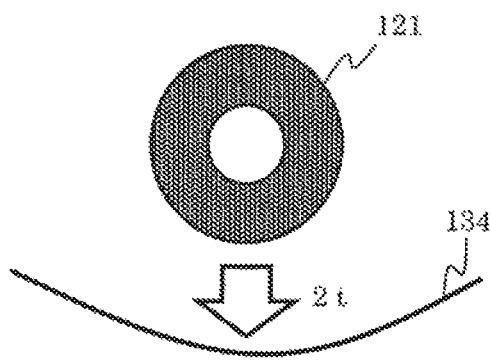
FIG. 15A is a schematic view illustrating one example of the displacement of the road surface serving as a reference.
Figure 15B:
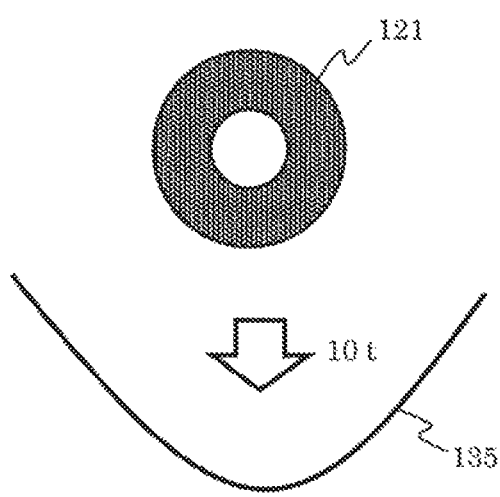
FIG. 15B is a schematic view illustrating the displacement of the road surface which is similar to the displacement of the road surface in FIG. 15A.

FIG. 15A is a diagram illustrating one example of the displacement of the road surface as a reference. FIG. 15B is a diagram illustrating one example of the displacement of the road surface similar to the displacement of the road surface in FIG. 15A. FIG. 15A illustrates road surface 134 having a displacement caused by contact of tire 121. In FIG. 15A, assume that a weight of 2 t is applied to road surface 134 by tire 121. In contrast, FIG. 15B illustrates road surface 135 having a displacement caused by contact of tire 121. In FIG. 15B, assume that a weight of 10 t is applied to road surface 135 by tire 121.

Here, assume that the contact area of tire 121 in contact with road surface 134 and the contact area of tire 121 in contact with road surface 135 are the same. Assuming that the displacement of the road surface is proportional to the weight when the contact area is fixed, the displacement shapes of the road surface formed under application of different weights are similar shapes. In other words, if the reference deformation shape and the axle load at this time are associated and stored in memory 280, the axle load of vehicle 120 can be calculated by calculating how many times larger is the displacement shape of the displacement measured by displacement calculator 250 than the reference deformation shape. In the case illustrated in FIGS. 15A and 15B, the displacement shape of road surface 134 and an axle load of 2 t in FIG. 15A are associated and stored in memory 280, and calculation is performed about how many times larger is the displacement shape of road surface 135 in FIG. 15B than the displacement shape of road surface 134. In this case, the result of calculation is 5 times, and the axle load in FIG. 15B is 2 t×5=10 t.

Alternatively, axle load calculator 270 may store the axle load in memory 280 in association with the maximum value of the displacement or the average of displacements in a predetermined region, rather than the displacement shape of the road surface, and may calculate the axle load by comparing the maximum value of the displacement or the average of displacements in the predetermined region calculated by displacement calculator 250 with the stored value. The relation of the displacement shape may be represented using a high-order function, rather than proportion.

2-3-3. State of Tire

Axle load calculator 270 may correct the axle load using the state of the tire. For correction according to the state of the tire, it is necessary to know the spatial distribution of the displacement of the road surface according to vehicles. As the spatial distribution of the displacement of the road surface, a breadth of the displacement of the road surface measured from a captured image may be used, the displacement of the displacement shape of the road surface measured by a falling weight delectometer (FWD) may be used, or a spatial distribution calculated in simulation may be used. Here, the spatial distribution of the displacement per unit weight is stored in storage 255 as a reference displacement function. In the case where the reference displacement function depends on the road surface position, the reference displacement function is defined for each position on road surface 131. In the case where the reference displacement function depends on the type and size of tire, the reference displacement function is defined for each type and size of tire. For correction of the state of the tire, most simply, assume that the displacement of the road surface is a linear combination of displacements of tires. Then, a load applied to each tire can be calculated from the state of the tire. Off course, the displacement of the road surface may be represented by any shape or function other than linearity.

Figure 16:
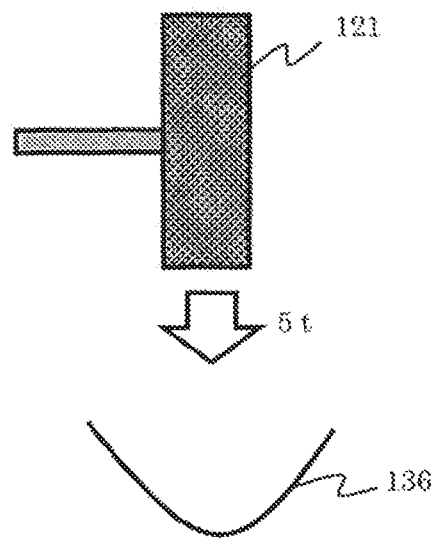
FIG. 16 is a schematic view illustrating the displacement of the road surface in a single tire.
Figure 17:
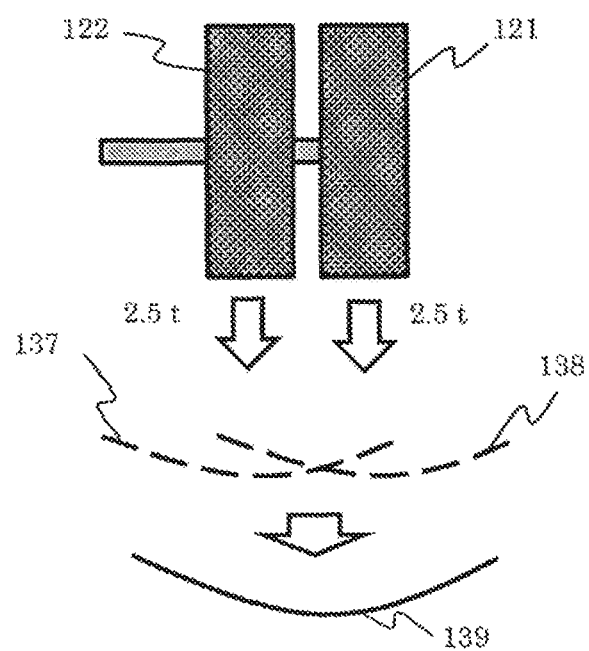
FIG. 17 is a schematic view illustrating the displacement of the road surface in dual tires.

Here, the difference in the displacement of the road surface due to the number of tires in a wheel will be described with reference to FIGS. 16 and 17. FIG. 16 is a schematic view illustrating the displacement of the road surface in a single tire. FIG. 17 is a schematic view illustrating the displacement of the road surface in dual tires.

For example, an ideal wheel load for a wheel on one side is 5 tons in a vehicle having an axle load of 10 tons. In the case of the single tire wheel, a load of 5 tons from single tire 121 is applied to road surface 136 of a road to cause a displacement in road surface 136 as illustrated in FIG. 16. In contrast, as illustrated in FIG. 17, in the case of the dual tires, a wheel load of 5 tons, after dispersed to two tires 121 and 122, is applied to road surface 139. This is because an increase in the number of tires attached to a single axle reduces the load applied to each tire, thus reducing the displacement of the road surface. In this case, the displacement of the road surface on the road corresponds to displacement 139 of the road surface obtained by synthesis of displacement 138 of the road surface caused by a load of 2.5 tons applied from tire 121 and displacement 137 of the road surface caused by a load of 2.5 tons applied from tire 122.

As illustrated in FIGS. 16 and 17, the displacement of the road is smaller in the dual tires than in the single tire even if the axle load or the wheel load is the same. From this, for example, the measurement precision of the axle load can be enhanced by changing displacement coefficient α in the relational expression used in conversion from the displacement to the axle load according to the number of tires in a wheel.

Here, the displacement of the road surface measured is represented by (Equation 1), where the displacement is represented as a linear combination of displacements of tires. The wheel load for each tire is the load obtained by distributing the axle load applied to a single axle to the tires arranged in the single axle. Specifically, when the weight applied to the axle is equally distributed to the tires, the wheel load is the load obtained by dividing the axle load by the number of tires arranged in a single axle.

$$D(x) = w1 \times base1(x-x1) + w2 \times base2(x-x2) \quad \text{(Equation 1)}:$$

To be noted, x1 is a position immediately under tire 121, x2 is a position immediately under tire 122, w1 is the wheel load of tire 121, and w2 is the wheel load of tire 122. Moreover, base1 is the reference displacement function of tire 121, base2 is the reference displacement function of tire 122, and D is the displacement function indicating the displacement for position x. In the case where the reference displacement function depends on the type and size of tire, the reference displacement function is defined for each type and size of tire. In the case where the reference displacement function varies for each road surface position because of the road surface, the structures of road accessories, and the degree of degradation, the reference displacement function may be defined for each absolute position on the road surface. In this case, the reference displacement function is represented by as base3(u, x) or base4(u, x). Here, u represents a relative position from immediately under the tire, and x represents the absolute position immediately under the tire. At this time, displacement D is represented by (Equation 2).

$$D(x) = w1 \times base3(x-x1, x1) + w2 \times base4(x-x2, x2) \quad \text{(Equation 2)}:$$

Axle load calculator 270 recognizes the type and size of the tire (load type) from an image, and selects the reference displacement function based on this.

Here, x≥0. At x<0, the imaging apparatus cannot capture road surface 139, and thus the calculation of the displacement does not need to be considered.

In (Equation 1) and (Equation 2), the two weights (wheel loads) w1 and w2 applied to the tires are unknown. Because there are two unknown numerals, the weights applied from tires 121 and 122 (wheel loads) can be calculated from (Equation 1) and (Equation 2) by measuring the displacements at two or more measurement points. In the case of two or more tires, the weights applied to the tires (wheel loads) can be calculated in the same manner as above by increasing the measurement point according to the number of unknown numerals (the number of tires). Moreover, w1 and w2 can be determined with higher precision using a larger number of measurement points than the requisite minimum number thereof and using the method of least squares or robust regression. Alternatively, by increasing the measurement point, positions x1 and x2 of the tires may also be treated as unknown numerals, and may be calculated simultaneously with the calculation of w1 and w2.

Here, assuming that the axle load is equally dispersed to the tires attached to the same axle, w1=w2, resulting in a reduction in the number of unknown numerals. For this reason, the number of measurement points can be reduced.

In the above description, in the case where a plurality of tires is attached to a single axle, the displacement in the single axle is represented by the linear combination of displacements of the tires. However, the displacement in the single axle can be represented by any other method. For example, a parameter (weight) enabling reproduction of the synthetic displacement may be estimated using other functions or simulation.

Specifically, when correction information obtainer 260 obtains the correction information from the captured image, the correction information indicating that vehicle 120 includes dual tires, axle load calculator 270 calculates the axle load based on the displacements of positions on road 130 and two reference displacement functions where the positions of the tires in the dual tires of vehicle 120 each are under a load.

Figure 18:
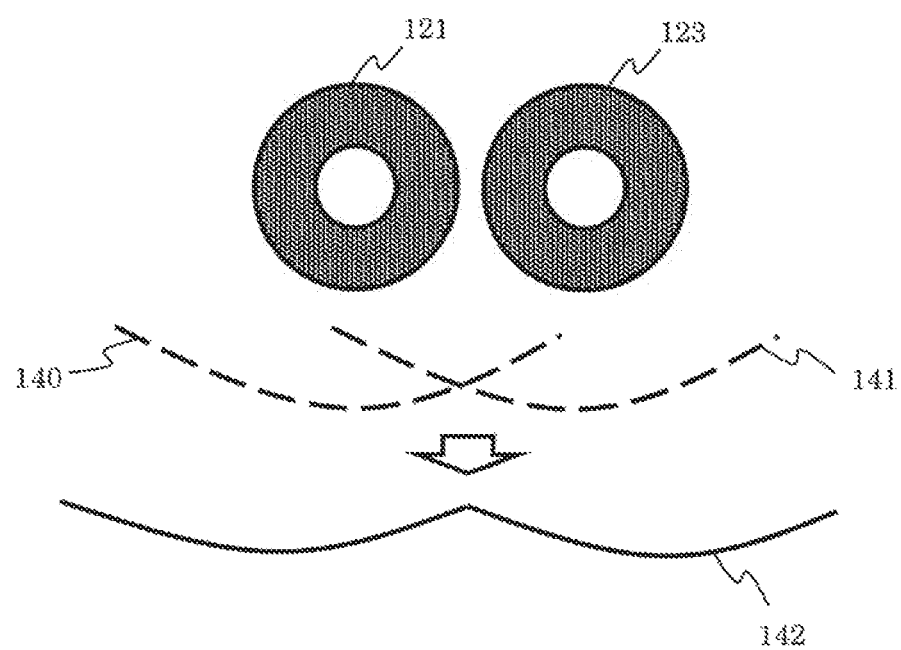
FIG. 18 is a diagram illustrating the relation between the inter-axle distance and the displacement of the road surface.

As illustrated in FIG. 18, there may be overlapping of influences from another axle in some cases. FIG. 18 is a diagram illustrating the relation between the inter-axle distance and the displacement of the road surface. In FIG. 18, assume that tire 121 is the tire on the first axle and tire 123 is the tire on the second axle. Then, displacement 140 of the road surface by tire 121 and displacement 141 of the road surface by tire 123 affect each other, resulting in displacement 142 of the road surface as the displacement of the road surface in this case. In this case, the axle load may be calculated using the relational expression represented by (Equation 3) as described above.

$$D(y) = w1 \times base5(y-y1) + w2 \times base6(y-y2) \quad \text{(Equation 3)}:$$

Here, y1 represents the position on the first axle, y2 represents the position on the second axle, w1 represents the axle load of the first axle, and w2 represents the axle load of the second axle. Moreover, base5 represents the reference displacement function of the first axle, base6 represents the reference displacement function of the second axle, and D represents the displacement function indicating the displacement for position y.

Although the reference displacement functions represented by (Equation 1), (Equation 2), and (Equation 3) are defined according to the one-dimensional position, a two-dimensional displacement distribution including an orthogonal dimension may be defined. An example of such a two-dimensional displacement distribution will be shown in (Equation 4).

$$D(x,y) = w1 \times base7(x-x1, y-y1) + w2 \times base8(x-x2, y-y2) \quad \text{(Equation 4)}:$$

Here, D(x, y) is the displacement of position (x, y), (x1, y1) is the two-dimensional position of tire 121, and (x2, y2) two-dimensional position of tire 122. The shape of the reference displacement function varies according to the single tire axle or the dual tire axle (load type).

Specifically, when correction information obtainer 260 obtains the first position of a front tire (on the first axle) of vehicle 120 and the second position of a rear tire (on the second axle) as the correction information from a captured image, axle load calculator 270 calculates the axle load based on displacements of positions on road 130 and two displacement functions where the first position and the second position each are under a load.

Although only the tires and the axles within the region of the image have been considered, the axle load may be determined in consideration of the influences from the tires and the axles present outside the region of the image. In this case, using another image captured at a time different from that of the target captured image, the moving velocity of the tire is determined based on the position of the same tire 121 or tire 123 detected at a different time by position detector 240. Based on the time information of the captured image and the moving velocity, position detector 240 calculates at least one of the positions of tire 121 and tire 123 present outside the region of the image. By applying this position to (Equation 1) to (Equation 4), the axle load is estimated. The axle load can be calculated with higher precision by considering the influences from the load outside the image.

2-3-4. Temperature

Axle load calculator 270 may correct the axle load using the air temperature or the road surface temperature. The correction of the temperature may be the same as the correction in measurement of the deformation amount with a falling weight deflectometer (FWD). The temperature may be corrected using a correction table produced by measuring the displacements of the road surface caused by loader objects having known weights at temperatures.

The road surface temperature may be fixed, or may be stepwise set. When the road surface temperature is stepwise set, correction may be performed using a correction table which stores correction coefficients for the temperature ranges. By storing the correction table in memory 280, the correction table can also be used in the case where the temperature is fixed.

2-3-5. Speed of Vehicle

Axle load calculator 270 may correct the axle load using the speed of vehicle 120. From the speed of vehicle 120, the resistance value may be calculated based on a theoretical formula to correct the axle load. Alternatively, a vehicle having a known weight may be run at a variety of speeds, and a correction table may be produced from the displacements of the road surface at that time. The axle load may be corrected using the resulting correction table.

Alternatively, the accelerating rate may be calculated from the speed, and correction using the accelerating rate may be performed. In this case, the axle load may be corrected using a correction table which stores correction coefficients for the calculated accelerating rates. The correction table is stored in memory 280.

2-3-6. Contact Area of Tire

Axle load calculator 270 may correct the axle load using the contact area of the tire with the road surface. In the case of the single tire, the pressure applied to the road surface varies according to the contact area of a wheel. For this reason, the displacement of the road surface also varies. From this, state determiner 261 detects the type of tire in addition to the number of tires per axle. Axle load calculator 270 may change displacement coefficient $\alpha$ according to the number of tires and the type of tire.

The displacements of the road surface caused by loader objects having known weights and different contact areas may be measured to produce a correction table, and correction may be performed according to the contact area. Alternatively, from simulation by numeric analysis such as a multilayer elastic theory, another appropriate calculation expression, or a finite element method, the correction term may be calculated using the contact area.

2-3-7. Movement of Vehicle

The movement of the vehicle may be detected from the captured image using image processing to perform correction according to the movement. For example, in the case where the vehicle vibrates, using a plurality of captured images, the average of displacements of the road surface may be considered as the displacement of the road surface. Thus, averaging can cancel the influences on the displacement when the vehicle body sinks and rises.

It may be appropriate that the captured images which may reduce the precision of the calculation of the displacement under such a variety of conditions above, such as captured images including an increase in accelerating rate and captured images including up-and-down movements of the vehicle, are not used in the measurement of the axle load.

3. Effects

Axle load measuring apparatus 200 according to Embodiment 1 is an axle load measuring apparatus which measures the axle load of vehicle 120 using a captured image of road 130 and vehicle 120 on road 130 captured by an imaging apparatus, and includes displacement calculator 250, correction information obtainer 260, and axle load calculator 270. Using the captured image, displacement calculator 250 detects the displacements of positions of road 130 caused by the axle load. Storage 255 stores the reference displacement function of road 130 when a load is applied. Correction information obtainer 260 obtains the correction information based on the vehicle or the imaging apparatus. Axle load calculator 270 calculates the axle load based on the displacements of the positions, the reference displacement function, and the correction information.

Thereby, the displacement of the road surface which may vary on a variety of conditions can be measured. In particular, by measuring the displacement of the road surface at a plurality of points and calculating the axle load based on the reference displacement function, individual axle loads can be separated from the displacements of the road surface where different axle loads coexist, and the axle load can be measured with high precision. Use of the displacements at a plurality of points enables highly precise calculation of a change in posture of the imaging apparatus, enhancing the precision in measurement of the axle load. Use of the displacements of the road accessories can also ensure a larger number of measurement points, enhancing the precision in measurement of the axle load.

OTHER EMBODIMENTS

As above, Embodiment 2 has been described as an example of the technique disclosed in this application. However, the technique according to the present disclosure should not be limited to these, and can be applied to embodiments appropriately modified, replaced, added, or omitted.

In the present disclosure, the road is captured using a single imaging apparatus. However, captured images produced using a plurality of imaging apparatuses may be subjected to the same processing as that in the present disclosure, and the axle load may be calculated using a final displacement calculated from a plurality of results of calculation. A plurality of captured images may also be used. Thereby, the precision in calculation can be enhanced.

In the case where the inclination of imaging apparatus 100 to road surface 131 is changed by the displacement of road surface 131, the inclination of imaging apparatus 100 may be estimated through position estimation of imaging apparatus 100 by global motion, fixed point motion, three-dimensional reconfiguration, or structure from motion (SFM) to correct the installation information stored in memory 280.

State determiner 261 in correction information obtainer 260 (see FIG. 2) may recognize the shape of the wheel of vehicle 120. Specifically, state determiner 261 may recognize the shape of the wheel of vehicle 120 through image recognition using the captured image obtained by imaging apparatus 100. From the recognized shape of the wheel, state determiner 261 may obtain the information indicating the number of tires per axle of vehicle 120 as the correction information. Here, usually, the shape of the single tire wheel is different from that of the dual tire wheel. Specifically, the shape of the dual tire wheel has a concave shape viewed from the outside because two tires are attached to one side of the axle. State determiner 261 can obtain the information indicating the number of tires per axle of vehicle 120 by recognizing the difference in shape.

Figure 19:
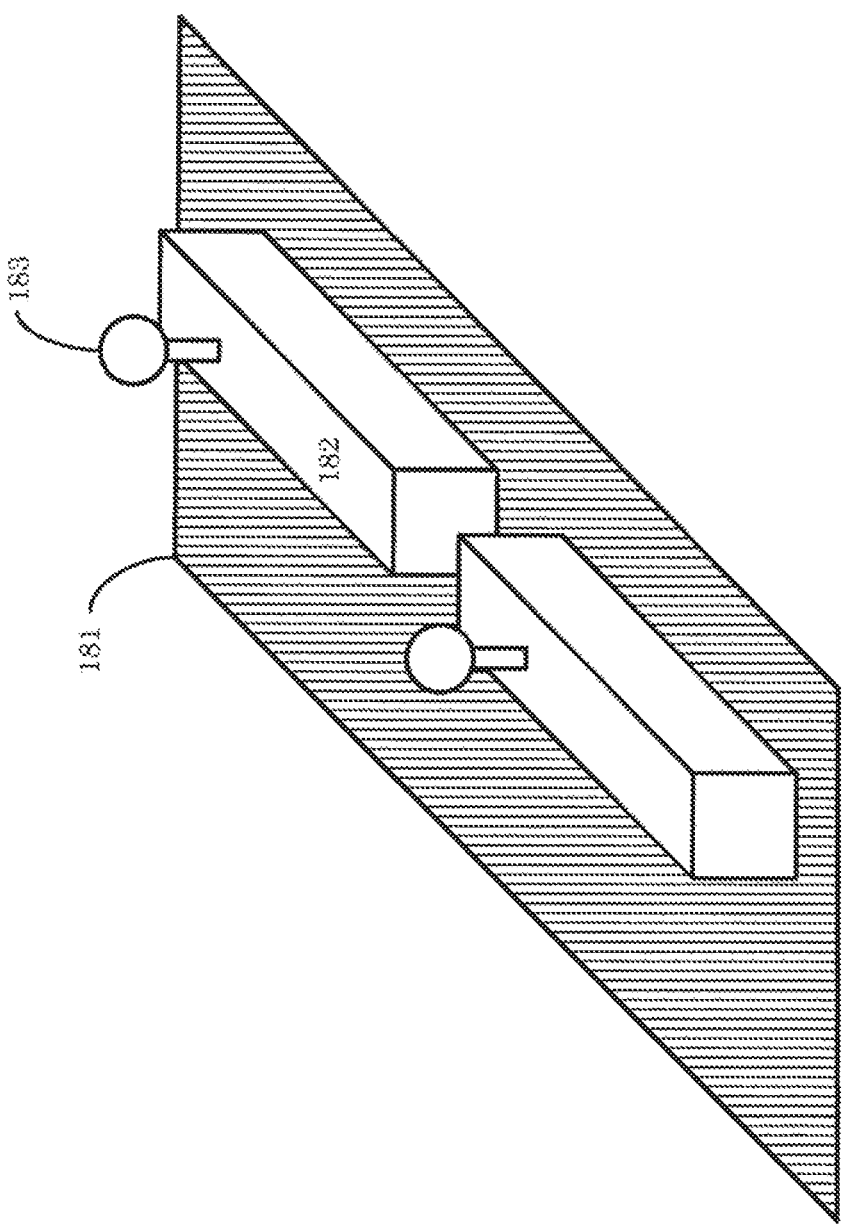
FIG. 19 is a diagram illustrating road accessories on a road surface.

Although the present embodiment has been described using only the displacement of road 181, the same effect is obtained by detecting the displacements of road accessories, for example, road accessories (such as curbstone 182, reflector 183, sidewalks, and traffic islands) on road surface 181 as illustrated in FIG. 19, using the captured image of the road accessories on the road surface near the vehicle traveling position. In other words, at least one of the displacements at a plurality of positions calculated by displacement calculator 250 may be used as the displacement of a road accessory (such as curbstone 182, reflector 183, a sidewalk, or a traffic island) on road 181 contained in the captured image.

In the present disclosure, axle load measuring apparatus 200 has been described as an example of the configuration implemented by a computer including a microprocessor and a memory and causing the microprocessor to execute a program stored in the memory. However, the displacement measuring apparatus can have any other configuration than the exemplary configuration implemented as above as long as it has an equivalent function to that of the above implemented example. For example, part or all of the components constituting axle load measuring apparatus 200 may have an exemplary configuration implemented by a dedicated circuit/dedicates circuits.

Moreover, the components (functional blocks) in axle load measuring apparatus 200 may be individually implemented as single chips in the form of a semiconductor device such as an integrated circuit (IC) or a large sale integration (LSI), or may be formed into a single chip such that part or all of them are included. Such an integrated circuit may be implemented not only by the LSI but also by a dedicated circuit or a general purpose processor. A field programmable gate array (FPGA) or a reconfigurable processor enabling reconfiguration of connection and setting of a circuit cell inside an LSI after the production of the LSI may be used. Furthermore, if progression of the semiconductor technique or derivation of another technique therefrom leads to an emergence of a technique of implementing the integrated circuit which can replace the LSI, the functional blocks may be integrated using such a technique. Biotechniques can be used.

All or part of the variety of processings above may be implemented by hardware such as an electric circuit, or may be implemented using software. The processings by software are implemented by causing a processor included in axle load measuring apparatus 200 to execute programs stored in the memory. The programs may be recorded on a recording medium, and may be distributed or circulated. For example, by installing the distributed programs in an apparatus or a device having another processor, and causing the processor to execute the programs, the apparatus or the device can execute the processings above.

The present disclosure also covers embodiments implemented as any combination of the components and functions illustrated in the embodiment above.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used in axle load measuring apparatuses which measure the axle loads of vehicles from captured images of vehicles traveling on roads.

What is claimed is:

1. An axle load measuring apparatus which measures an axle load of a vehicle using a captured image of a road and the vehicle on the road, the axle load measuring apparatus comprising:
    a displacement calculator which detects displacements of positions on the road caused by the axle load using the captured image;
    a storage which preliminarily stores a displacement function representing shape information of a spatial distribution of a displacement of the road originated from a predetermined position on the road when a certain amount of load is applied to the predetermined position on the road; and
    an axle load calculator which calculates the axle load based on the displacements of the positions and the displacement function,
    wherein the displacement function is a one-variable function representing a one-dimensional distribution of a displacement of a road surface representing the distribution of the displacement where the predetermined position is a center or a two-variable function representing a two-dimensional distribution of the displacement of the road surface.

2. The axle load measuring apparatus according to claim 1, further comprising:
    a correction information obtainer which obtains correction information from the captured image, the correction information being based on the vehicle or an imaging apparatus which has taken the captured image,
    wherein the correction information is information on tire positions of the vehicle, information on a type of tires of the vehicle, or information on a posture of an imaging apparatus which has taken the captured image, and
    the axle load calculator calculates the axle load based on the displacements of the positions, the displacement function, and the correction information.

3. The axle load measuring apparatus according to claim 2,
    wherein the correction information obtainer obtains a position of a tire of the vehicle as the correction information from the captured image, and
    the displacement calculator detects the displacements of the positions using the tire positions.

4. The axle load measuring apparatus according to claim 3,
    wherein the correction information obtainer obtains a first position of a tire on a first axle of the vehicle and a second position of a tire on a second axle as the correction information, and
    the displacement function is obtained by adding: a product of an axle load of the first axle and a first displacement function of the first position; and a product of an axle load of the second axle and a second displacement function of the second position.

5. The axle load measuring apparatus according to claim 4,
wherein the correction information obtainer calculates at least one of the first position and the second position present outside an image region of the captured image using another captured image taken at a different time.

6. The axle load measuring apparatus according to claim 2,
wherein the correction information obtainer obtains the correction information from the captured image, the correction information indicating that the vehicle includes dual tires.

7. The axle load measuring apparatus according to claim 6,
wherein the displacement function is obtained by adding a product of a wheel load of a first tire of the dual tires and a third displacement function of a position of the first tire and a product of a wheel load of a second tire of the dual tires and a fourth displacement function of a position of the second tire.

8. The axle load measuring apparatus according to claim 2,
wherein using another captured image taken at a different time, the correction information obtainer obtains a change in image capturing direction of the imaging apparatus in the captured image as the correction information.

9. The axle load measuring apparatus according to claim 8,
wherein when the change in image capturing direction exceeds a predetermined threshold, the correction information obtainer outputs a notice indicating abnormality of the image capturing direction of the imaging apparatus.

10. The axle load measuring apparatus according to claim 1,
wherein at least one of the displacements of the positions is a displacement of a road accessory on the road included in the captured image.

11. A method of measuring an axle load of a vehicle using a captured image of a road and the vehicle on the road, the method comprising:

detecting displacements of positions on the road caused by the axle load using the captured image;

reading out a displacement function representing shape information of a spatial distribution of a displacement of the road originated from a predetermined position on the road when a certain amount of load is applied to the predetermined position on the road, the displacement function being preliminarily stored; and calculating the axle load based on the displacements of the positions and the displacement function, wherein the displacement function is a one-variable function representing a one-dimensional distribution of a displacement of a road surface representing the distribution of the displacement where the predetermined position is a center or a two-variable function representing a two-dimensional distribution of the displacement of the road surface.

* * * * *